United States Patent [19]

Hallamasek et al.

[11] Patent Number: 5,757,575
[45] Date of Patent: May 26, 1998

[54] TRACK-CURVATURE DETECTION USING CLOCK PHASE SHIFT IN AZIMUTH RECORDING

[75] Inventors: Kurt F. Hallamasek, Oakland; Keith A. Kambies, Fremont; George R. Varian, Palo Alto, all of Calif.

[73] Assignee: Ampex Corporation, Redwood City, Calif.

[21] Appl. No.: 741,969

[22] Filed: Oct. 31, 1996

[51] Int. Cl.⁶ .................................. G11B 21/02
[52] U.S. Cl. .................... 360/75; 360/50; 360/51
[58] Field of Search .................. 360/75, 69, 50, 360/51, 110, 119, 76

[56] References Cited

U.S. PATENT DOCUMENTS

| | | |
|---|---|---|
| 4,573,619 | 3/1986 | Grant ........................ 360/75 X |
| 5,103,354 | 4/1992 | Singhoff et al. . |
| 5,223,994 | 6/1993 | Behr et al. . |
| 5,371,638 | 12/1994 | Saliba . |
| 5,394,277 | 2/1995 | Pahr et al. . |
| 5,420,731 | 5/1995 | Thomas et al. . |
| 5,432,652 | 7/1995 | Comeaux et al. . |
| 5,448,430 | 9/1995 | Bailey et al. . |
| 5,488,520 | 1/1996 | Aizawa et al. . |
| 5,510,938 | 4/1996 | Sakakibara et al. . |
| 5,552,944 | 9/1996 | Clemow . |

Primary Examiner—Muhammad N. Edun
Attorney, Agent, or Firm—Cesari and McKenna, LLP

[57] ABSTRACT

A servomechanism for controlling the position of a magnetic-tape playback head (16) with respect to a track (24) of digital data on a magnetic tape (22) positions the head by reference to an error signal that error-signal-generation circuitry (FIG. 10) generates. Sample-clock signals obtained from simultaneously read azimuth-recorded data tracks clock respective frequency dividers (52 and 54), and a phase detector 56 generates the error signal by comparing the frequency dividers' outputs.

8 Claims, 9 Drawing Sheets

TRACK-CURVATURE DETECTION USING CLOCK PHASE SHIFT IN AZIMUTH RECORDING

BACKGROUND OF THE INVENTION

The present invention is directed to magnetic-tape players and in particular to methods for properly positioning magnetic read heads over digital data tracks on the tape.

Magnetic read heads of the type depicted in FIGS. 1 and 2 read data stored in magnetic domains on magnetic tape. A coil 12 wound around a pole piece 14 of a recording head 16 causes a magnetic field in a gap 18 that the pole piece 14 forms. The gap is positioned adjacent to a magnetic tape containing ferromagnetic material, and magnetic domains in the magnetic tape are magnetized in accordance with the direction of the coil current. The FIG. 2 view of the head surface seen from the tape's point of view shows a gap 18 that forms an angle with the head body, for reasons that will become apparent directly.

During the recording process, the tape advances past the recording head 16's position. In most high-capacity magnetic-tape arrangements, such as those employed for videotape, the head is mounted on a scanner that itself additionally rotates with respect to the tape, typically at a circumferential speed that is a large multiple of the tape's speed. As FIG. 3 shows, the locations 20 of a plurality of separately driven head gaps may be disposed about a rotating scanner 21's circumference. For reasons that will become apparent below, the gaps occur in pairs. The two gaps of a pair are offset from each other in the direction perpendicular to the page and operate simultaneously.

It may at first seem that the scanner's spinning with respect to the tape would result in one gap pair's overwriting the data that a previous pair has recorded. But FIGS. 4A and 4B show that there is an angle between the head path and the tape path. So the head pairs record data in successive pairs of tracks 24 (FIG. 5) oriented at an angle to the longitudinal tape direction. (Actually, some intentional overwriting does occur so that the track width is narrower than the head width, but this detail is not important to the present discussion.)

Reading the data thus recorded occurs in the reciprocal manner: the changing gap fields resulting from head passage over the tape domains cause electromotive forces in the coil that tape-player circuitry processes to extract the recorded information. But the read heads need to be accurately positioned over the recorded data tracks if they are to read properly. So they are mounted on the scanner by positioning mechanisms that can adjust their positions.

There are a number of existing ways of determining that the positioning mechanism has positioned the read head on the scanner properly. The "bump and sniff" method, for example, makes an incremental change in head position between track scans. If the resultant average signal level in the next scan is less than in the previous scan, the adjustment is concluded to have been in the wrong direction, and the next incremental position change is in the opposite direction. Conversely, an average-signal-level increase results in the next incremental change's being in the same direction.

This inter-track type of adjustment yields a head position for each track that tends to minimize the average position error for that track. But it does not additionally provide compensation for track curvature. To adapt the bump-and-sniff approach to the intra-track adjustment needed for curvature compensation would require that some of the "bumps" occur in the midst of a track scan. For various reasons, this tends not to be favored, and other techniques are usually employed for curvature compensation.

The invention described below is a way of developing a position-error signal that lends itself particularly to use for curvature compensation. It is an improvement in a prior-art error-signal-generation technique that employs what will be referred to below as "azimuth recording."

The prior-art error-signal-generation technique takes advantage of expected patterns, such as "synchronization sequences," in the recorded data. Synchronization sequences are used for byte framing. A playback machine necessarily uses a sample clock to time its digital-data sampling. Preamble sequences of alternating bit values occur at least at the beginning of each track. The sample clock achieves the proper frequency by reference to the preamble, and it subsequently maintains proper phase by observing bit-transition times. The player thereby determines bit locations accurately.

But accurately reading individual bits is not enough. The playback machine must also frame bit sequences properly into bytes. To help the playback machine maintain proper byte synchronization, some recording techniques record data in such a manner that each track's (relatively long) data record is divided into a plurality of shorter synchronization blocks, each of which begins with a known synchronization pattern. When the playback machine recognizes the synchronization pattern, it "knows" that the immediately following bit is the start of a new byte. By thus breaking each track into a number of synchronization blocks, the system limits the duration of any given byte-synchronization loss.

Now, the prior-art error-signal-generation approach puts expected patterns such as this synchronization sequence to an additional use, namely, the detection of head-position errors. It does so by additionally exploiting "azimuth recording," which is the purpose for the gap angle that FIG. 2 illustrates. Just as FIG. 5 illustrates an angle between the data tracks and the tape's longitudinal direction, FIG. 6 shows that the recording-head gap 18 itself forms an angle with each track 24. The signal that results from reading data thus recorded is greatest if the read head is similarly oriented, and it is greatly reduced if the read head's gap angle differs significantly from the recording head's.

Recording and playback systems take advantage of this phenomenon to reduce inter-track crosstalk. Adjacent tracks are recorded at different azimuth angles and are read with read heads whose gap angles differ correspondingly. The beneficial result is that a given head responds preferentially to its intended track's signals and tends to reject signals from adjacent tracks.

FIGS. 7A–C show how complementary azimuth angles additionally make it possible to use synchronization sequences for detecting head-position error. FIG. 7A shows two complementarily oriented read-head gaps 28 and 30 properly positioned over corresponding azimuth-recorded tracks. For purposes of explanation, we assume that such gaps will encounter respective synchronization patterns 32 and 34 simultaneously if the gaps are positioned properly. (This condition is unnecessary and rarely attends this method's use in practice, but assuming it simplifies discussion without detracting from an understanding of the principle involved.) Under this assumption, a position error will cause a difference between the times at which those gaps encounter the synchronization patterns, as FIGS. 7B and 7C illustrate. If the heads are moving to the right with respect to the tracks 24, an upward error causes the upper gap to reach the upper synchronization pattern later than the lower gap reaches the lower synchronization pattern. The opposite position error causes an opposite change to the two synchronization patterns' time-of-arrival difference. So this error-signal-generation method uses an indication of the two synchronization sequences' time-of-arrival differences as an error signal.

SUMMARY OF THE INVENTION

We have recognized that previous approaches to exploiting azimuth recording are needlessly complicated and inflexible, and we have devised an approach that not only exhibits greater simplicity and flexibility but can also afford greater accuracy. Instead of generating the error signal from the times of respective synchronization patterns' occurrences, we generate it from the relative phases of the two channels' data clocks.

Just as the delays between different tracks' synchronization patterns depend on their heads' positions, the delays between the clock signals recovered from the two oppositely angled azimuth-recorded channels do, too. But the present invention can be implemented much more simply, since clock-signal paths are usually more conveniently positioned than paths that carry the signals on which the prior-art approach is based. And the present invention is much more flexible, because it is not nearly as dependent on the recording format; so long as the tape contains azimuth-recorded digital signals, it functions independently of tape-format changes. Furthermore, since the clock signals' updates occur much more frequently than just at the start of each synchronization block, the present invention samples the error much more frequently and thus affords the possibility of greater control accuracy.

BRIEF DESCRIPTION OF THE DRAWINGS

The invention description below refers to the accompanying drawings, of which.

DETAILED DESCRIPTION OF AN ILLUSTRATIVE EMBODIMENT

The illustrated embodiment of the present invention employs the invention's teachings to develop a curvature-compensation component of a head-actuator control signal. By other means, such as a conventional "bump and sniff" system, the head-actuator control signal also includes a component whose purpose is to minimize the mean head-position error. The description below does not deal with the latter component's generation, and the below-described development of the curvature-compensation component is based on the assumption (which, of course, is only approximately true) that the mean error is zero.

Figure 1:
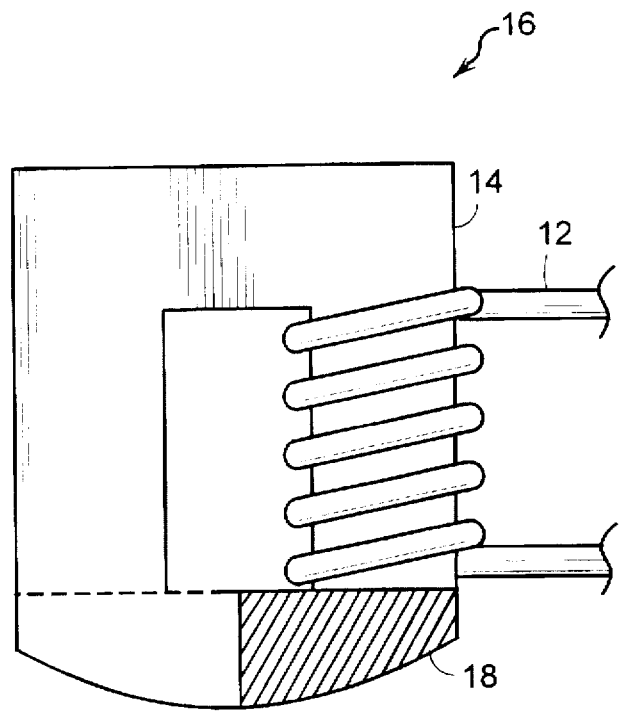
FIG. 1 is a front elevation of a typical magnetic recording head.
Figure 2:
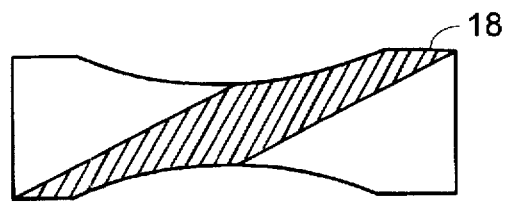
FIG. 2 is bottom view of the magnetic recording head depicted in FIG. 1.
Figure 3:
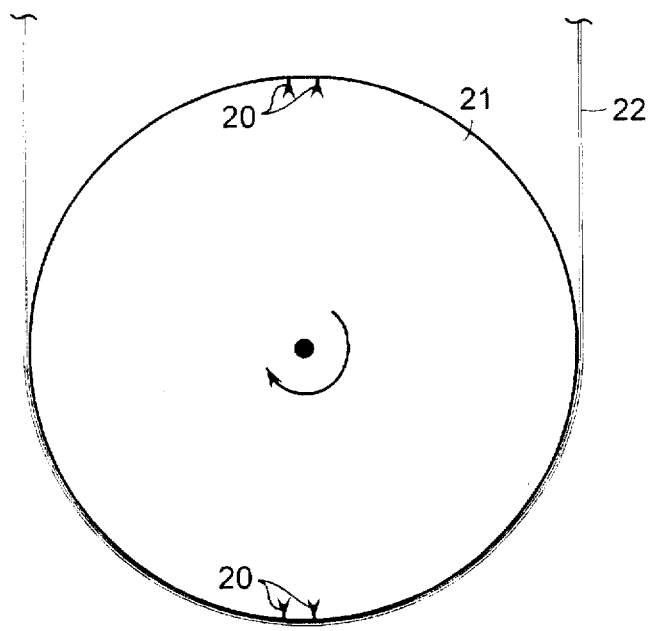
FIG. 3 is a diagrammatic view of a multi-head magnetic-recording scanner illustrating its rotation with respect to videotape that it is reading.
Figure 4A:
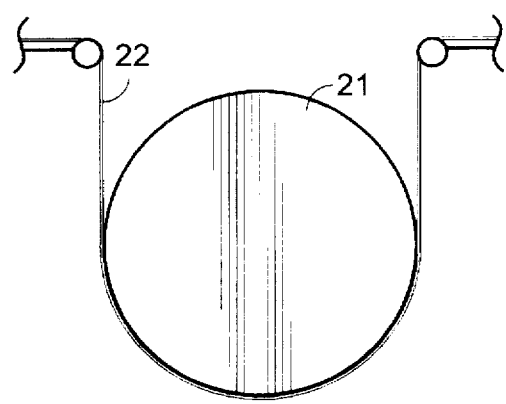
FIGS. 4A and 4B are diagrams that together illustrate the relationship between head path and tape orientation.
Figure 4B:
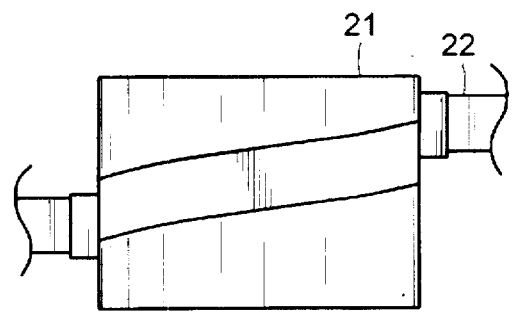
Figure 5:
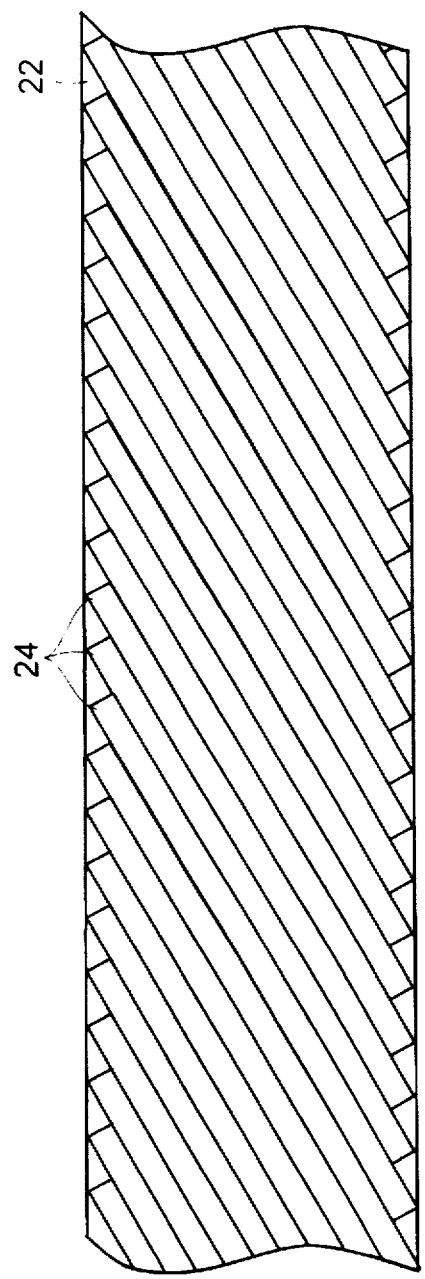
FIG. 5 is a diagram depicting the resultant recording tracks on the magnetic tape.
Figure 8:
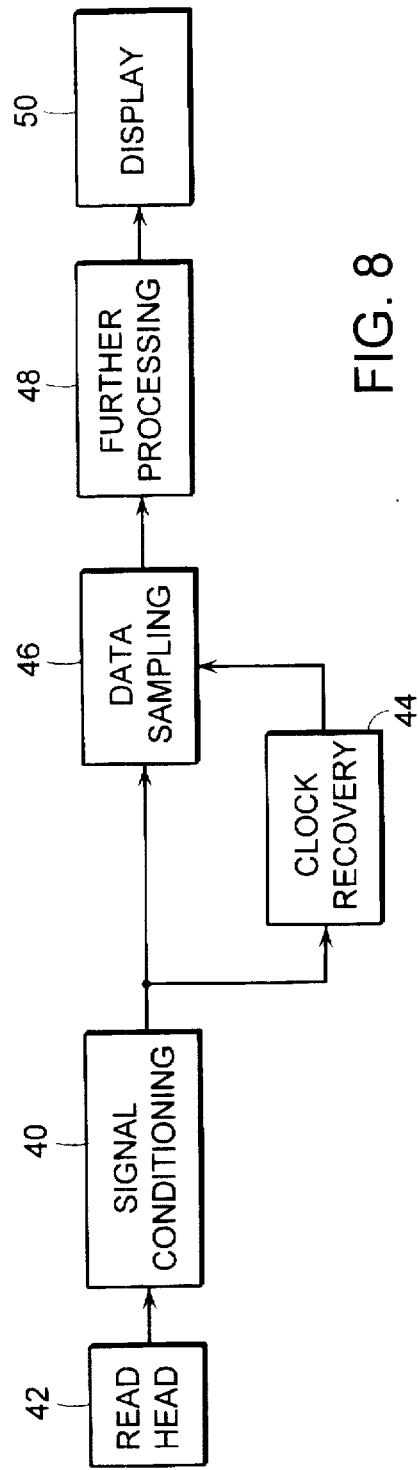
FIG. 8 is a block diagram of a typical signal-processing sequence in a magnetic-tape playback machine.
Figure 9:
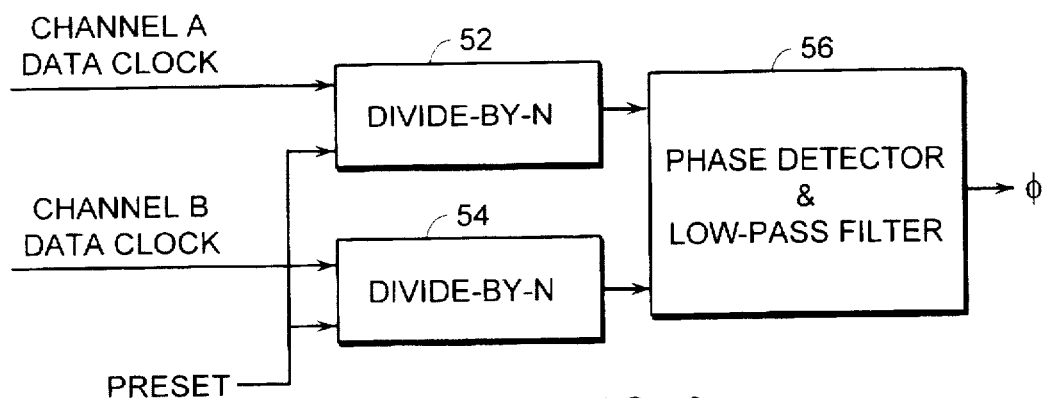
FIG. 9 is a simplified block diagram of the error-signal-generation circuitry employed in one embodiment of the present invention.

In FIG. 8, a signal-conditioning circuit 40 conditions a read head 42's output signal, and a clock-recovery circuit 44 derives from the result a clock signal that times output-signal sampling. Circuit 44 typically takes the form of a phase-locked loop, but the particular form of the clock-recovery circuit is not critical in the present context. Sampling circuitry 46 thus timed produces bit samples that further processing circuitry 48 uses for driving a display device 50 or some other purpose. As FIG. 3 shows, the scanner employs two simultaneously operating read heads, so there are two channels of the FIG. 8 type and thus two clock signals.

Figure 6:
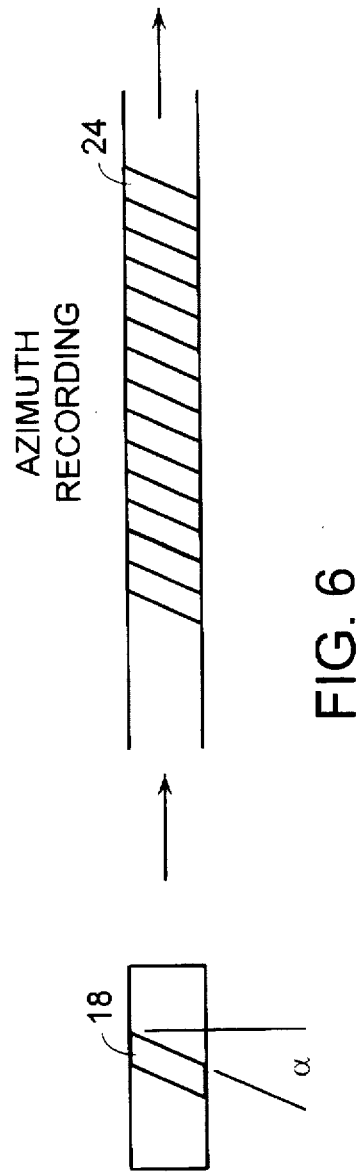
FIG. 6 is a diagram that depicts the angular relationship between a head gap and a magnetic-tape track.

Just as the head positioning affects the synchronization-pattern timing, it also affects the relative timing of the two clock signals. Specifically, the change $\Delta\tau$ in the delay $\tau$ between the two clock signals as a function of the head-positioning error $\epsilon$ is given by:

$$\Delta\tau(\epsilon) = \frac{2\epsilon \tan\alpha}{v_{head\text{-}to\text{-}tape}},$$

where $\alpha$ is the angle that the gap forms with the track normal in FIG. 6 and $v_{head\text{-}to\text{-}tape}$ is the speed of the spinning head with respect to the track that it is reading.

The track-curvature-compensation control system described below by reference to FIGS. 9–12 employs this relationship. But the curvature-error range likely to be encountered is such that the delay is often considerably greater than the clock period. So the clocks' relative phase does not unambiguously indicate the curvature error's magnitude. For this reason, we provide a pair of divide-by-N counters 52 and 54 depicted in FIG. 9. These counters divide the clocks' frequencies by a predetermined integer N. The phase relationship between the counter outputs can unambiguously indicate the head-positioning error's size and direction if the resultant counter-output period $N/f_{clock}$ is significantly greater than the likely range of the delay change $\Delta\tau$, where $f_{clock}$ is the sample-clock frequency. Curvature-error detection can therefore be based on the output of a phase detector 56 that compares the two counters' outputs.

Now, we are interested here only in curvature, not in any DC component of position error. Therefore, we can start the relationship between the two frequency-divided signals at any arbitrarily selected value and then subtract the mean value out at the end of a scan to yield the curvature profile that we are seeking. And a little reflection reveals that it is convenient for the two frequency-divided signals to begin 90° out of phase. So a preset pulse (FIG. 9) establishes this relationship. As can be appreciated by reference to FIG. 3, the tape player must switch gap pairs at the beginning of each new track pair. A delay circuit 58 in FIG. 10 receives a gap-pair-selection signal 60 that accompanies the switch to a new track pair, and it generates the preset pulse on line 62 after a predetermined delay that permits the channel clocks to become synchronous with their respective tracks.

This pulse clears counters 64 and 66, which are the primary elements of frequency dividers 52 and 54, respectively. It also clears a D-type flip-flop 68, which is a further component of frequency divider 52. Counter 66 functions as a four-bit counter and thus serves to divide the frequency of its respective incoming sample-clock signal by sixteen. Counter 64 and flip-flop 68 together similarly operate as a divide-by-16 frequency divider for the other incoming sample-clock signal. But counter 64 operates as a three-bit counter that clocks the flip-flop 68, which is wired as a one-bit counter. So frequency divider 54's output starts 90° out of phase with frequency divider 52's output.

This phase relationship continues so long as the head gaps remain in the same positions with respect to their respective magnetic-tape tracks. The phase detector 56's XOR gate 70, which compares the two frequency-divided signals, therefore produces an output signal having a 50% duty cycle, and a low-pass filter 72 consequently produces an output whose value equals 50% of the logic-value range. If a departure from a predicted track curvature results in drift between the head and track positions, the delay between the two clock signals changes, as was explained above, so low-pass filter 72's output does, too. By sampling filter 72's output and removing the DC component, we obtain the curvature-error signals employed in the control system that FIGS. 11 and 12 illustrate.

Figure 11:
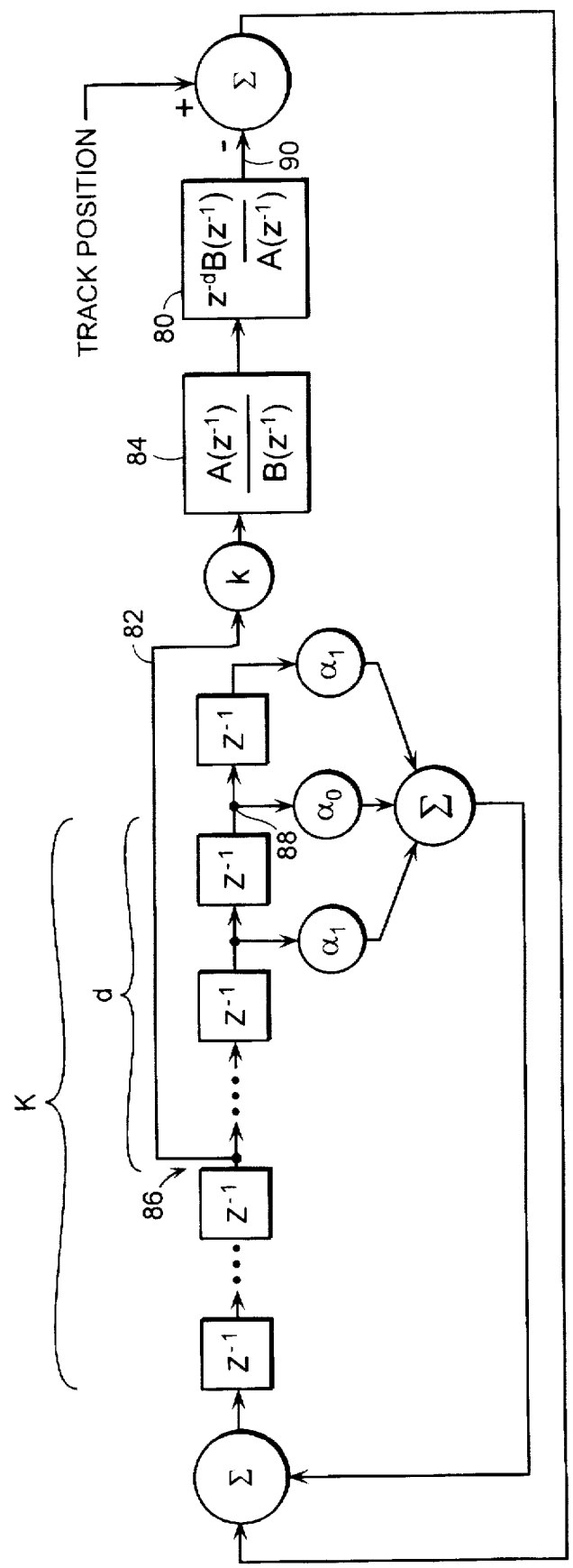
FIG. 11 is a simplified diagram of the error-signal-generation circuitry's environment.
Figure 12:
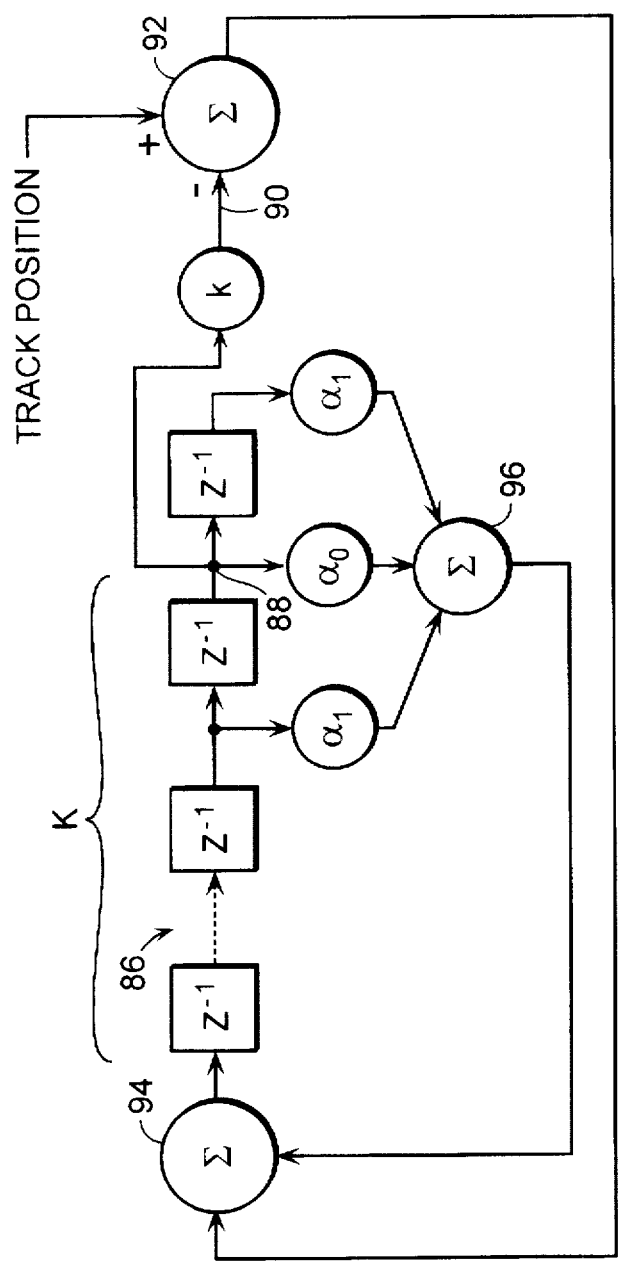
FIG. 12 is an alternative representation of the FIG. 11 system.

FIG. 11 depicts the head actuator 80 as its linearized discrete-time model. The curvature-correction component of actuator's input is based on a curvature prediction on line 82, which in turn is generated from the above-described curvature-error measurement in a manner that will be explained presently. The actuator 80's input additionally includes the mean-error correction, as was explained above, and it may include other components as well, but the drawings deal only with the curvature-compensation component.

The curvature prediction is applied to a network 84 that compensates for the actuator 80's dynamics. Of course, a network function strictly equal to the inverse of the track actuator's transfer function would be non-causal, so the function that network 84 employs is inverse to the actuator transfer function advanced in the time domain by enough to make the inverse function causal. FIG. 11 depicts this advance as being d curvature-sample periods.

Now, the curvature prediction on line 82 is one tap output of a delay line 86, and the signal on a further tap 88 is the same as that on line 82, with the exception that the tap-88 output is delayed from the line-82 curvature prediction by the d-sample delay of the actuator 80 and its compensation network 84. So, to the extent that network 84 does indeed cancel the actuator's dynamics, the curvature component 90 of the head's position is simply proportional to the tap-88 signal in accordance with the control gain k, and the system of FIG. 11 can be represented by FIG. 12, which omits the canceling delays.

FIG. 12 represents the measured curvature error as the output of a summing junction 92, which takes the difference between the curvature components of the head and track positions. To determine the predicted curvature for a given point in the next scan, this curvature error for a corresponding point in the current scan is added, in an operation represented by a further summing junction 94, to a noise-filtered version of the predicted curvature from which that error resulted. Specifically, an operation represented by a summing junction 96 adds the product of a filter coefficient $\alpha_0$ and the node-88 signal—which is proportional to the predicted curvature 90—to advanced and delayed versions of the node-88 signal multiplied by a further filter coefficient $\alpha_1$.

The curvature prediction thus computed then appears as the head position's curvature component at the corresponding point in the same head pair's next scan, as FIG. 12 indicates by its K-curvature-sample-period delay line 86, where K is the number of curvature-sample periods between a given head pair's successive scans. (An alternative embodiment of the present invention could use the thus-computed curvature prediction for the other head pair's next scan, but we prefer to generate a given head pair's curvature prediction from data generated only during scans by that same head pair.)

The timing that FIGS. 11 and 12 illustrate serves to explain the operation in principle. In practice, the timing may differ significantly in order to provide two further features. The first of these features is the removal of the DC component. For purposes of explanation, the output of FIG. 11's summing junction 92 was described as being samples of the low-pass-filter output from FIG. 10 after DC-component removal. But the value of a given track's DC component cannot be known in practice until the end of that track's scan. So some of the present invention's embodiments may employ a timing arrangement such as the one that FIG. 13 illustrates.

Figure 10:
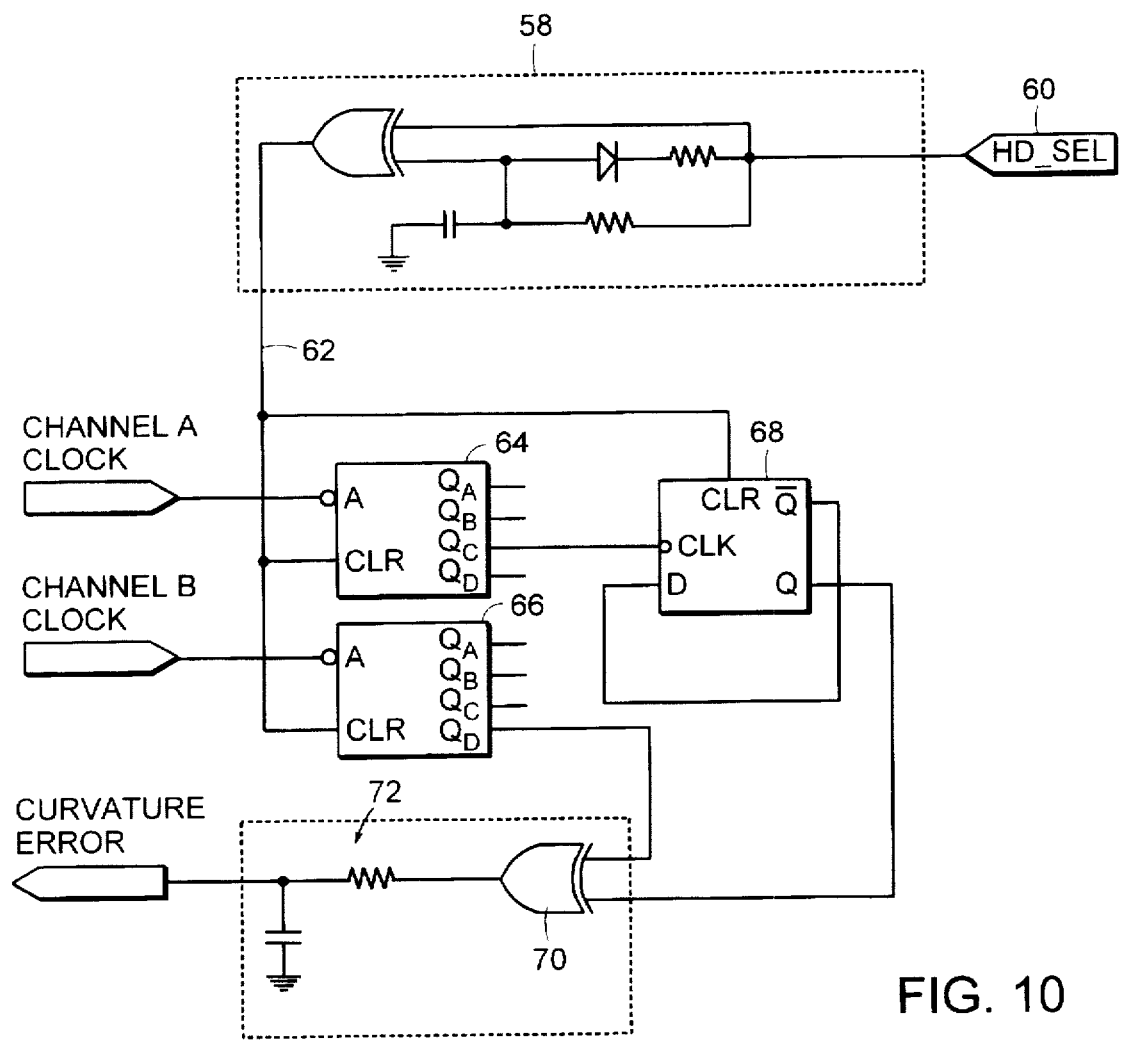
FIG. 10 is a logic-level diagram of the illustrated embodiment's error-signal-generation circuitry.
Figure 13:
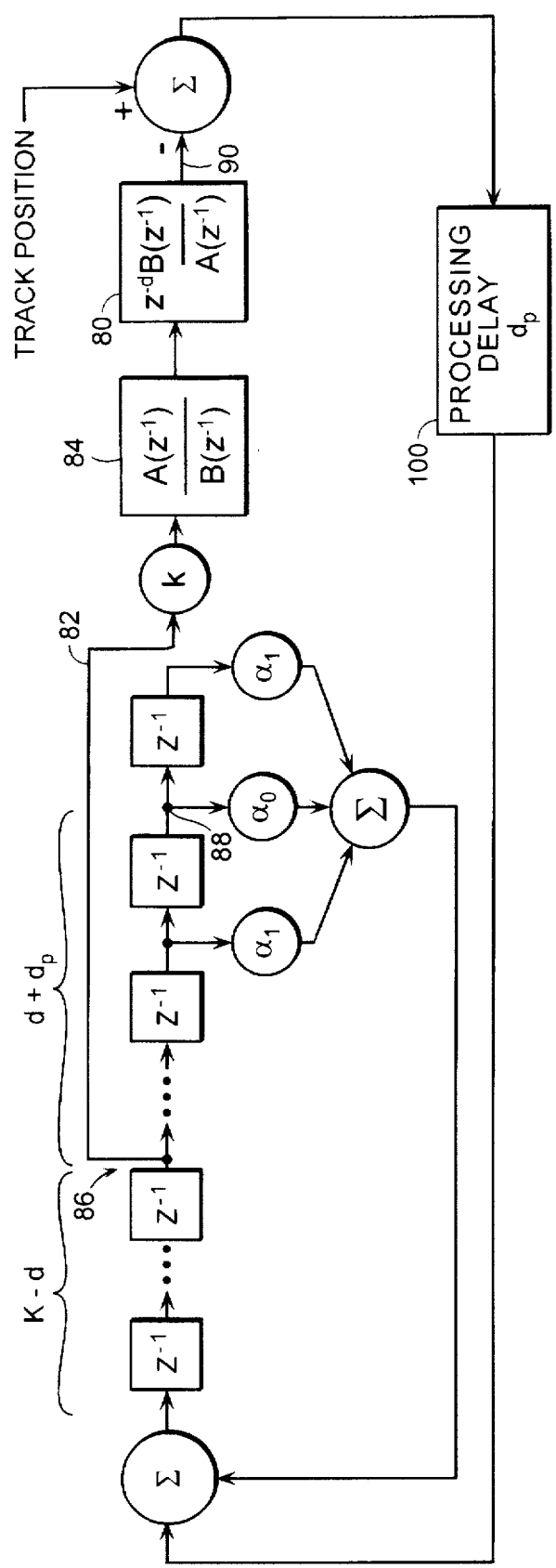
FIG. 13 is a block diagram that is similar to FIG. 11 but illustrates timing accommodations for DC removal and other computations.

FIG. 13 is similar to FIG. 11, but it includes a block 100, which represents a processing delay of $d_p$ curvature-error-sample periods between the FIG. 10 measurement and generation of the resultant curvature-error value. This additional delay $d_p$ is the time required to accumulate and remove the DC component and to implement an extrapolation feature, which will be described presently by reference to FIGS. 14A and B. To accommodate this additional delay, the delay between the compensation network 84's curvature-prediction input and its appearance at node 88 for use as the curvature-prediction value that resulted in block 100's current curvature-error output is $d+d_p$ rather than d.

Figure 7A:
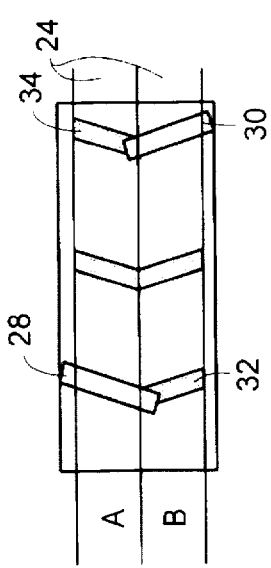
FIGS. 7A–C are diagrams depicting the effects of improper head positioning on the relative timing of different tracks' synchronization patterns.
Figure 7B:
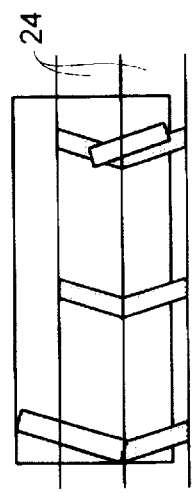
Figure 7C:
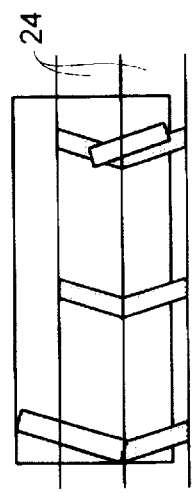
Figure 14A:
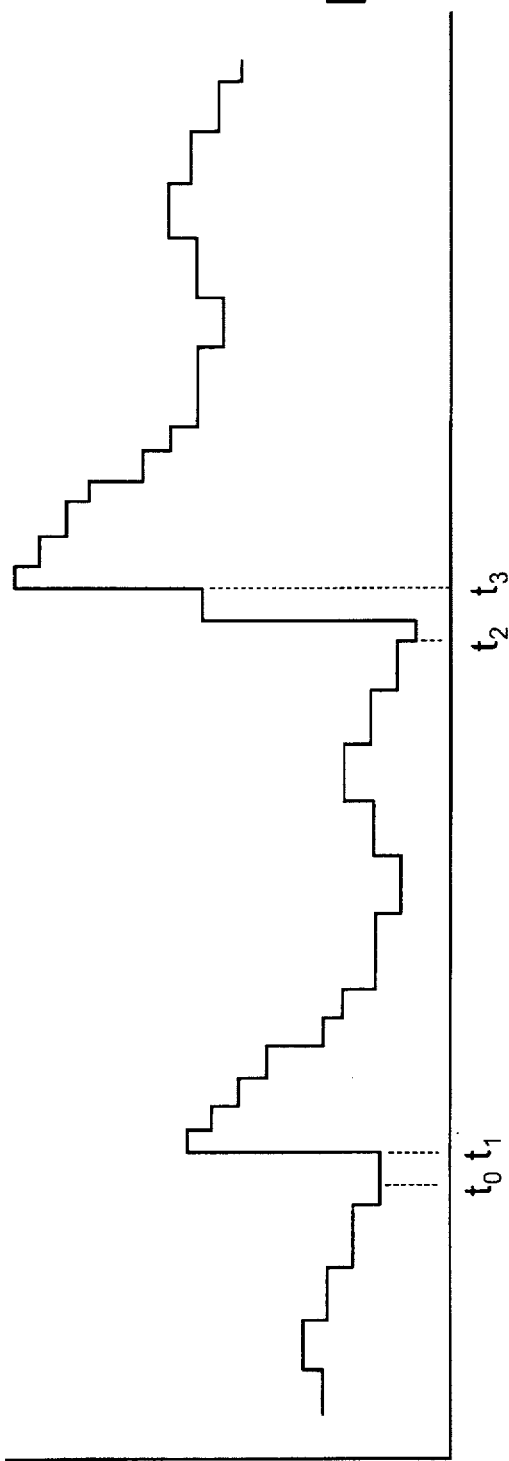
FIGS. 14A and B are graphs of curvature-error measurements used to illustrate the present invention's extrapolation aspect.

FIG. 14A is a plot of the measurements that result from sampling the FIG. 10 output. Before $t_0$, a first read-head pair produces the channel signals from which the channel clocks are extracted. At time $t_0$, the signal source for one channel is switched from that pair to the other pair. The other channel switches sources, too, but its read head is disposed slightly behind the other's, as FIG. 7A illustrates, so there is a delay before both channel clocks again come from the same head pair.

As a result, the FIG. 10 output is less accurate at the beginning of the track than it is later; since the second head is not producing a clock signal at the start of the track, there initially is nothing on which to base a meaningful clock-delay measurement, so the curvature-error signal from FIG. 10 does not reflect the new pair's head position until time $t_1$. There is a corresponding effect at the end of the track: one channel switches sources before the other.

We have found that curvature prediction can be improved significantly if it is based on curvature-error values at the beginning and end of the track that are extrapolations of more-reliable intermediate measurements. So we employ, say, conventional polynomial extrapolation of the first measurements after $t_1$ and the last measurements before $t_2$ to replace the FIG. 10 outputs between times $t_0$ and $t_1$ and between times $t_2$ and $t_3$ with the values that FIG. 14B illustrates.

Figure 14B:
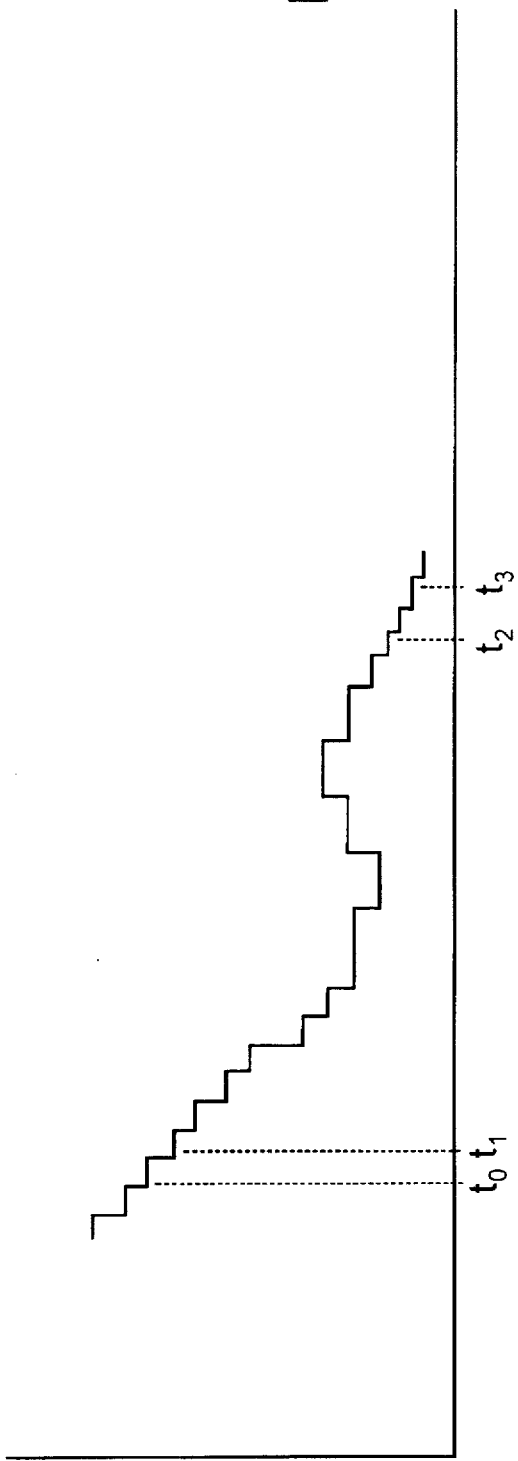

In accordance with another aspect of the present invention, we additionally use extrapolation to generate the values that FIG. 14B illustrates to the left of $t_0$. Unlike the values to the left of $t_0$ in FIG. 14A, which represent measurements that will be used in controlling the head pair that is operative before time $t_0$, those in FIG. 14B will be used in controlling the other head pair before it begins supplying the channel signals. In other words, we use curvature-error measurements in controlling head position even before the heads need to be positioned accurately.

The reason for doing so can be understood by observing the curvature measurements immediately after $t_0$, when one head of the second head pair starts producing output. There the curvature-error measurements exhibit a relatively rapid change, and the resultant curvature prediction could also exhibit such a change. In the absence of this aspect of the invention, the actuator would not be driven before $t_0$ to follow the extrapolated "curvature," so the head actuator would need to accelerate the heads suddenly to a significant velocity. So either the system would have to employ head actuators capable of the requisite force or it would be unable to position the read heads with the curvature prediction's accuracy. By using this extrapolation method, that accuracy can be obtained without the expense of faster actuators.

Those skilled in the art will recognize that the foregoing teachings can the realized in a wide variety of different implementations. Typically, an appropriately programmed digital signal processor will provide most of the digital processing that the drawings depict. The output of FIG. 13's summing junction 92 will typically be the output of an analog-to-digital converter that samples FIG. 10's analog output. The digital signal processor receives the resultant output and performs the extrapolation and DC removal whose delay FIG. 13's block 100 represents. The same digital signal processor typically would also perform all of the subsequent processing in FIG. 13 up through the compensation that FIG. 13's block 84 represents. A digital-to-analog converter and further signal-conditioning circuitry would apply the resultant quantity to the head-positioning mechanism.

By employing the present invention's teachings, one can provide track-curvature compensation in a flexible and inexpensive manner. The invention thus constitutes a significant advance in the art.

What is claimed is:

1. A magnetic-tape player comprising:
   A) a reading mechanism forming at least first and second head gaps and generating first and second head signals representative of the contents of respective magnetic-tape tracks simultaneously passing adjacent to the first and second head gaps, the first and second head gaps forming different angles with respect to the direction of relative motion between the gaps and the magnetic tape;
   B) first and second clock-recovery circuits that receive the first and second head signals, respectively, and generate therefrom first and second clock signals that represent the bit timing of data read from the magnetic tape;
   C) curvature-error-detection circuitry that responds to the first and second clock signals by generating a curvature-error signal indicative of the timing relationship between the two clock signals and thereby representing curvature error; and
   D) a head-position control system that positions the first and second head gaps in accordance with the curvature-error signal.

2. A magnetic-tape player as defined in claim 1 wherein the curvature-error-detection circuitry includes:

A) first and second frequency dividers that generate first and second frequency-divided signals from the first and second clock signals, respectively; and
   B) phase-detection circuitry that responds to the first and second frequency-divided signals by generating the curvature-error signal as a signal representative of the phase relationship between the first and second frequency-divided signals.

3. A magnetic-tape player as defined in claim 2 wherein the reading mechanism positions the gaps adjacent successive tracks in respective read intervals in accordance with curvature-error signals that the curvature-error-detection circuitry has generated during previous read intervals.

4. A magnetic-tape player as defined in claim 3 wherein:
   A) the reading mechanism alternately positions the head gaps, during respective read intervals, adjacent to the magnetic tape for reading respective magnetic-tape tracks and generating signals representative of those tracks' contents and so spaces the head gaps from the magnetic tape in respective mute intervals that the gaps are incapable of reading respective tracks' contents; and
   B) the head-position control system positions the first and second head gaps during at least a portion of at least some of the mute intervals in accordance with curvature errors extrapolated from the curvature errors represented by the curvature-error signals generated during previous read intervals.

5. A magnetic-tape player as defined in claim 1 wherein the reading mechanism positions the gaps adjacent successive tracks in respective read intervals in accordance with curvature-error signals that the curvature-error-detection circuitry has generated during previous read intervals.

6. A magnetic-tape player as defined in claim 5 wherein:
   A) the reading mechanism alternately operates in read intervals, in which the first and second head gaps are positioned to read respective magnetic-tape tracks and generate head signals representative of those tracks' contents, and mute intervals, in which the first and second gaps are not so positioned; and
   B) the head-position control system positions the first and second head gaps during at least a portion of at least some of the mute intervals in accordance with curvature errors extrapolated from the curvature errors represented by the curvature-error signals generated during previous read intervals.

7. For playing magnetic tape supplied thereto, a magnetic-tape player comprising:
   A) a reading mechanism that forms at least one head gap and alternately:
      i) positions the head gap during read intervals thereof to read respective magnetic-tape tracks on the magnetic tape and generate signals representative of those tracks' contents; and
      ii) so spaces the head gap from the magnetic tape in mute intervals thereof that the gap is incapable of reading those tracks' contents;
   B) curvature-error-detection circuitry for detecting the error in the head gap's positioning over successive tracks during respective read intervals and generating a curvature-error signal indicative of the error thus detected; and
   C) a head-position control system that responds to the curvature-error signal by positioning the head gap during at least a portion of at least some of the read intervals in accordance with the curvature error detected by the curvature-error-detection circuitry during previous read intervals and by positioning the head gap during at least a portion of at least some of the mute intervals in accordance with curvature errors extrapolated from the curvature errors detected by the curvature-error-detection circuitry during previous read intervals.

8. A magnetic-tape player as defined in claim 7 wherein:

A) the reading mechanism further forms a second head gap separate from the first-mentioned head gap and alternately:
   i) positions the second head gap during read intervals thereof to read respective magnetic-tape tracks on the magnetic tape and generate signals representative of those tracks' contents; and
   ii) so spaces the second head gap from the magnetic tape during mute intervals thereof that the second gap is incapable of reading those tracks' contents;

B) the first and second head gaps' read intervals overlap in overlap intervals;

C) the head-position control system positions the first and second head gaps at some points in the overlap intervals in accordance with the curvature error detected by the curvature-error detection circuitry at corresponding points in previous overlap intervals; and D) the head-position control system positions the first and second head gaps at some points in given read intervals in accordance with curvature errors extrapolated from the curvature error detected by the curvature-error detection circuitry at points in previous overlap intervals corresponding to other points in the given read intervals.

* * * * *